Oct. 15, 1940.    R. McKEE    2,218,403

ELECTROCUTING TRAP

Filed May 24, 1939

Roy McKee
INVENTOR

ATTORNEY

Patented Oct. 15, 1940

2,218,403

UNITED STATES PATENT OFFICE 2,218,403

ELECTROCUTING TRAP

Roy McKee, Tulsa, Okla.

Application May 24, 1939, Serial No. 275,553

7 Claims. (Cl. 43—99)

The invention relates to electrocuting traps, and has for its object to provide a device of this character particularly adapted for electrocuting mice, but applicable to the electrocution of rats.

A further object is to provide an electrocuting trap comprising a casing having a fluid receptacle therein for the reception of water or other fluid having conductor properties and electrodes carried by a closure and adapted to be moved into the water or out of the water when the closure is closed or opened.

A further object is to provide an insulated limiting means in the path of the electrodes for limiting the upward movement of the closure and electrodes when the trap is open for removing the liquid tray.

A further object is to provide an electrocuting trap comprising a casing having a liquid tray therein, in the liquid of which electrodes, carried by a slidable cover, are submerged when the closure is in closed position and the electrodes disposed above the receptacle when the closure is in open position, thereby allowing the liquid tray to be removed.

A further object is to provide a ramp to one side of the casing leading to the top of the casing and to a bait cage, and a counterweighted trap door in the bait cage by means of which the mouse is projected into the liquid receptacle.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
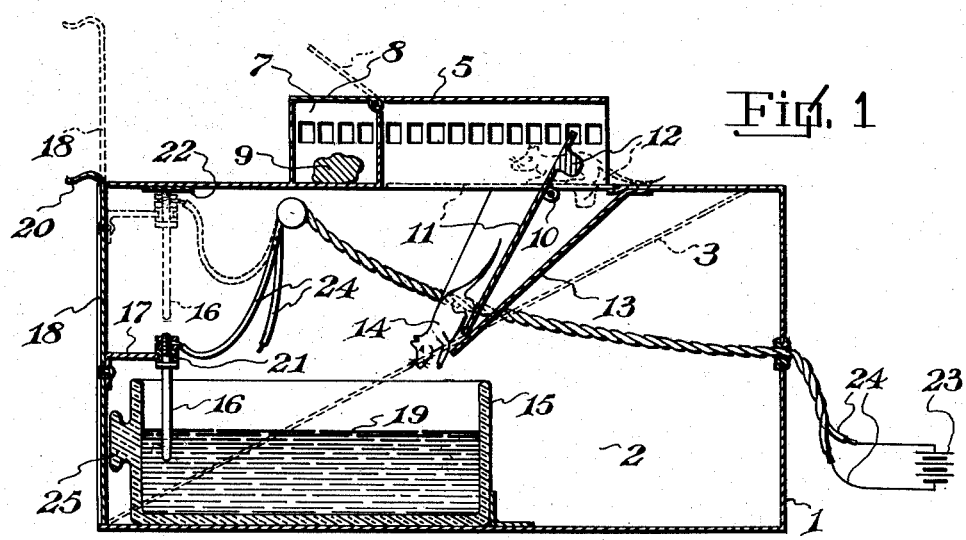
Figure 1 is a vertical longitudinal sectional view through the trap.
Figure 2:
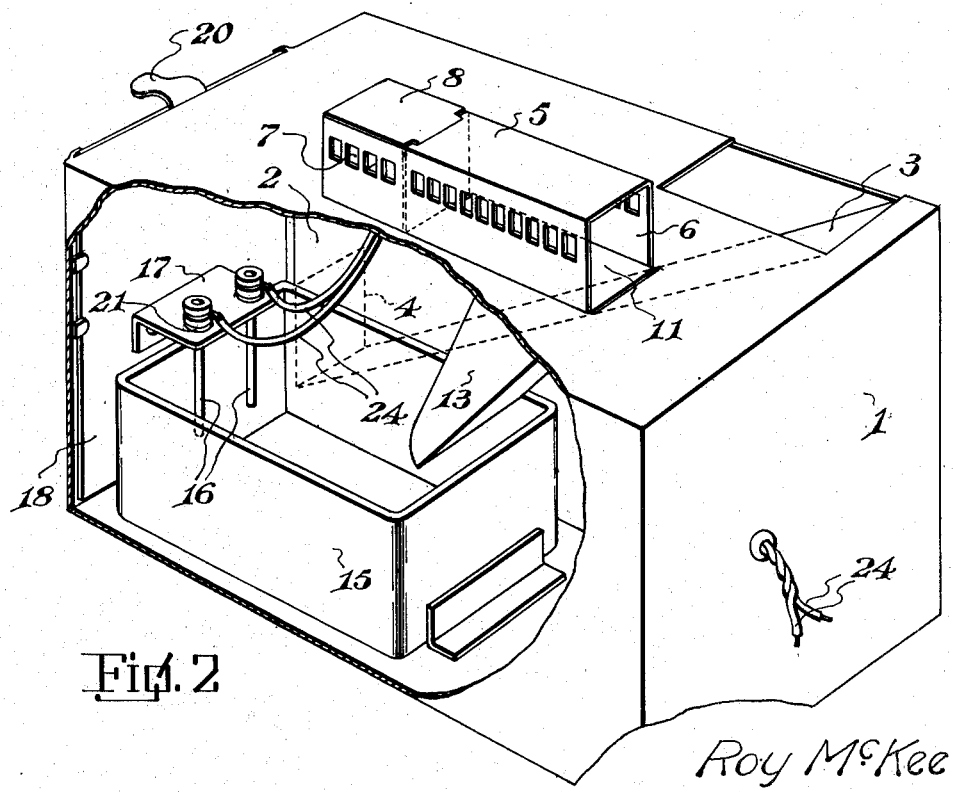
Figure 2 is a perspective view of the trap, part of the casing being broken away to better show the structure.

Referring to the drawing, the numeral 1 designates a rectangular shaped casing which is divided into two compartments by means of a partition 2. One compartment has an upwardly and rearwardly inclined ramp 3 therein, open at its forward end 4, and up which mice pass to enter the trap. Disposed on the upper side of the casing 1 is an elongated bait cage 5 having its rear end open as at 6 for the entrance of the mouse. The forward end of the bait cage 6 is provided with a compartment 7 having a hinged closure 8, and in which compartment 7, bait 9 is placed.

Hingedly mounted at 10 within the bait cage 5 is a trap door 11 having a counterweight 12 which normally maintains the trap door in a closed horizontal position. The trap door 11 swings downwardly into a limiting chute 13 as clearly shown in Figure 1, so the mouse 14 will slide downwardly and forwardly into the liquid receptacle 15. The receptacle 15 is preferably formed from glass which is a non-conductor material.

To eliminate danger of injury to the operator when removing the water trays the spaced electrodes 16 are carried by a bracket 27 on the inner side of the vertically slidable door or closure 18, and by referring to Figure 1, it will be seen that it will be necessary to raise the closure 18 before it is possible to remove the receptacle 15, and as the electrodes 16 terminate above the lower end of the closure, it is obvious the receptacle 15 can not be removed until the electrodes are out of the water or fluid 19 within the receptacle, hence danger to the operator is obviated.

The raised position of the closure 18 is shown in dotted lines in Figure 1, and the closure is provided with a fingerengaging member 20 so the operator can easily manipulate the same. The electrodes 16 are insulated from the bracket 17 by means of insulator sleeves 21, and the upward movement of the closure and electrodes is limited by the engagement of the electrodes with an insulating disc 22.

The electrodes 16 are in circuit with a source of power 23 through wires 24, and it will be seen that the circuit is completed through the water when the electrodes are submerged and that the circuit is broken when the electrodes are raised. The water 19, within the glass receptacle 15, is charged with electricity as it is in circuit with a source of power through the electrodes 16, therefore it will be seen the mouse or rat 14 will be shocked by an electric current when it enters the water. The same is true if the rat should struggle and come into engagement with the electrodes 16.

From the above it will be seen that an electrocuting trap is provided which is simple in construction and one wherein the electrodes are controlled by the closure and when the closure is opened the circuit is broken before the operator can remove the liquid receptacle from the trap. The liquid receptacle is provided with a knob 25 adapted to be grasped by the operator for handling the receptacle.

The invention having been set forth what is claimed as new and useful is:

1. The combination with an electrocuting trap comprising a casing having a liquid receiving tray into which rodents are discharged, of a closure carried by said casing, electrodes carried by said closure and positioned whereby when the closure is in closed position the electrodes will be partially submerged in liquid in the tray and when the closure is in open position the electrodes will be disposed above the tray, thereby allowing removal of the tray.

2. The combination with an electrocuting trap comprising a casing having a liquid receiving tray therein, a closure carried by said casing, electrodes within the casing and adapted to be partially submerged in fluid in the tray, of means controlled by the closure, whereby the electrodes are partially submerged in the tray when the closure is in closed position and the electrodes are above the tray when the closure is in open position thereby allowing removal of the tray from the casing.

3. The combination with an electrocuting trap comprising a casing, of a fluid receiving tray within said casing adjacent an opening in the casing, a slidable closure within the open end of the casing, a bracket carried by said closure and overlying the tray, spaced electrodes carried by said bracket and positioned to be partially submerged in liquid in the tray when the closure is in closed position and to be disposed above the tray and liquid when the closure is in open position.

4. An electrocuting trap comprising a casing, a slidable closure carried by one end of the casing, a fluid receiving receptacle within the casing and having one of its ends adjacent the closure, a bracket carried by the closure and overlying the last named end of the tray, electrodes carried by said bracket and extending downwardly into the fluid within the tray, the lower ends of said electrodes terminating above the lower end of the closure, said electrodes being disposed above the tray when the closure is open.

5. A device as set forth in claim 4 including a stop carried by the casing above the electrodes and in alinement with the electrodes.

6. A device as set forth in claim 4 including conductor members leading to the electrodes, an anchoring device for said members within the casing, the portions of said conductor members leading to the electrodes having sufficient slack therein for allowing movement of the electrodes to operative and inoperative positions.

7. The combination with an electrocuting trap having a fluid tray therein and a closure for said trap, of electrodes within the trap, said electrodes being partially submerged when the closure is in closed position and out of the fluid when the closure is in open position.

ROY McKEE.